(12) United States Patent
Djordjevic

(10) Patent No.: US 7,815,020 B2
(45) Date of Patent: *Oct. 19, 2010

(54) WHEEL BRAKE CALIPER

(75) Inventor: Goran Djordjevic, Vancouver (CA)

(73) Assignee: Hillmar Industries Ltd., Delta (CA)

( * ) Notice: Subject to any disclaimer, the term of this patent is extended or adjusted under 35 U.S.C. 154(b) by 133 days.

This patent is subject to a terminal disclaimer.

(21) Appl. No.: 11/941,866

(22) Filed: Nov. 16, 2007

(65) Prior Publication Data

US 2008/0060887 A1 Mar. 13, 2008

Related U.S. Application Data

(63) Continuation of application No. 11/196,343, filed on Aug. 4, 2005, now Pat. No. 7,328,778.

(51) Int. Cl.
*F16D 55/22* (2006.01)
(52) U.S. Cl. .................... 188/72.3; 188/170; 188/59
(58) Field of Classification Search ............... 188/72.3, 188/56, 37, 33, 34, 220.1, 59, 233.3, 25, 188/170
See application file for complete search history.

(56) References Cited

U.S. PATENT DOCUMENTS

| | | |
|---|---|---|
| 1,295,829 A | 2/1919 | Cook |
| 4,018,140 A | 4/1977 | Engle |
| 4,060,153 A | 11/1977 | Kobelt |
| 4,155,431 A | 5/1979 | Johnson |
| 4,823,916 A | 4/1989 | Shyu |
| 5,107,965 A | 4/1992 | Yates |
| 5,253,736 A | 10/1993 | Kohler |
| 5,660,250 A | 8/1997 | Treude |
| 5,782,321 A | 7/1998 | Treude |
| 5,887,683 A | 3/1999 | Yamashita |
| 5,988,327 A | 11/1999 | Snyder |
| 6,019,199 A | 2/2000 | Heidenrich |

FOREIGN PATENT DOCUMENTS

| | | |
|---|---|---|
| DE | 43 05 285 | 6/1994 |
| DE | 3509042 | 12/1996 |
| DE | 19609764 | 12/1996 |
| DE | 29814654 | 8/2002 |
| DE | 20212912 | 12/2003 |
| EP | 0 731 286 | 9/1996 |
| EP | 0850824 | 1/1998 |
| EP | 1 230 492 B1 | 8/2002 |
| WO | PCT/DE00/03925 | 5/2001 |

*Primary Examiner*—Bradley T King
(74) *Attorney, Agent, or Firm*—Cameron IP

(57) ABSTRACT

A crane wheel brake having a pair of brake shoes at opposite sides of a crane wheel. Each of the brake shoes has a brake pad, a brake pad guide roller, and a spring for biasing the brake pad guide roller to project beyond the brake pad towards the wheel. The brake pad guide roller is located in a central portion of the brake shoe. The wheel brake includes a pair of brake levers and a braking force generator. Each of the brake levers has a first end pivotally connected to a respective one of the brake shoes and a second end pivotally connected to a respective side of the braking force generator. Each brake lever is pivotally mounted by a fulcrum intermediate its first and second ends. The wheel presses against the brake pad guide roller on either one of the brake shoes and causes the wheel brake to pivot about the fulcrums to maintain a clearance between the brake pads and the wheel.

10 Claims, 8 Drawing Sheets

WHEEL BRAKE CALIPER

This application is a continuation of U.S. patent application Ser. No. 11/196,343 filed on Aug. 4, 2005 now U.S. Pat. No. 7,328,778 the complete disclosure of which is incorporated herein by reference.

BACKGROUND OF THE INVENTION

1. Field of the Invention

The present invention relates to wheel brakes for use with cranes and other material handling equipment. Wheel brakes are used, in part, to retard the motion of cranes against wind loads, both dynamically and statically.

2. Description of the Related Art

Conventional crane brakes, such as disclosed in U.S. Pat. No. 6,019,199, issued Feb. 1, 2000 to David C. Heidenreich, are hydraulic caliper disk brakes that include brake pad self-activating wear adjusters to maintain a constant brake gap. These brakes prevent brake pad wear only when the wheel to which they are applying the braking force do not have significant lateral movement, or float. On many cranes, however, the wheels substantially float from side to side. What is required in these situations is a wheel brake that maintains the separation between the wheel and the brake pad as the wheel floats from side to side, and provides brake pad and side wheel surface alignment while braking.

BRIEF SUMMARY OF THE INVENTION

It is accordingly an object of the present invention to provide a novel and improved wheel brake caliper which, in use, reduces or even entirely eliminates wear of the brake pads while not braking and self-aligns the brake pads to a wheel for even wear while braking.

In one aspect of the present invention there is provided, in combination, a wheel and a wheel brake. The wheel brake comprises a caliper having a pair of brake shoes at opposite sides of the wheel. Each of the brake shoes has a brake pad, a brake pad guide roller and a spring for biasing the brake pad guide roller beyond the brake pad towards the wheel.

The brake pad guide roller and spring serve to maintain separation between the wheel, which can float laterally, and the brake pad while not braking, and further to align the brake pad substantially with the side of the wheel while braking.

In another aspect of the present invention, the brake pad guide roller is located in a central portion of the brake shoe. When placed in this location, only one brake pad guide roller is required per brake shoe. Additionally, the brake pad guide roller in this location serves to provide a guiding means that keeps the brake pad parallel with the side of the wheel.

The caliper may include a pair of brake levers and a braking force generator. Each of the brake levers has a first end and a second end. The first ends are pivotally connected to respective ones of the brake shoes. The second ends are pivotally connected to opposite sides of the braking force generator. Each of the brake levers further includes a fulcrum intermediate the first and second ends and pivotally mounting the levers. In practice the wheel presses against either one of the brake pad guide rollers causing the wheel brake to pivot about the fulcrums to maintain separation between the brake pads and the wheel.

Each brake shoe may have a surface plane facing a respective side of the wheel. Furthermore, each brake pad guide roller has a rotational axis and is located at a central location of the respective brake shoe. The rotational axis of each brake pad guide roller is parallel with the respective surface plane.

In practice the wheel presses against either one of the brake pad guide rollers thereby pivoting the respective brake shoe and bringing the rotational axis parallel with the side of the wheel.

The present invention hereafter provides a wheel brake comprising a pair of brake shoes, a pair of brake pads attached to respective ones of the brake shoes and having opposed faces, a pair of brake pad guide rollers connected to respective ones of the brake shoes, a pair of springs biasing respective ones of the guide rollers beyond the opposed faces of the brake pads, and a brake force generator operatively connected to the brake shoes.

BRIEF DESCRIPTION OF THE DRAWINGS

The present invention will be more readily understood from the following description of a preferred embodiment thereof given, by way of example, with reference to the accompanying drawings, in which:—

DESCRIPTION OF THE PREFERRED EMBODIMENT

Figure 1:
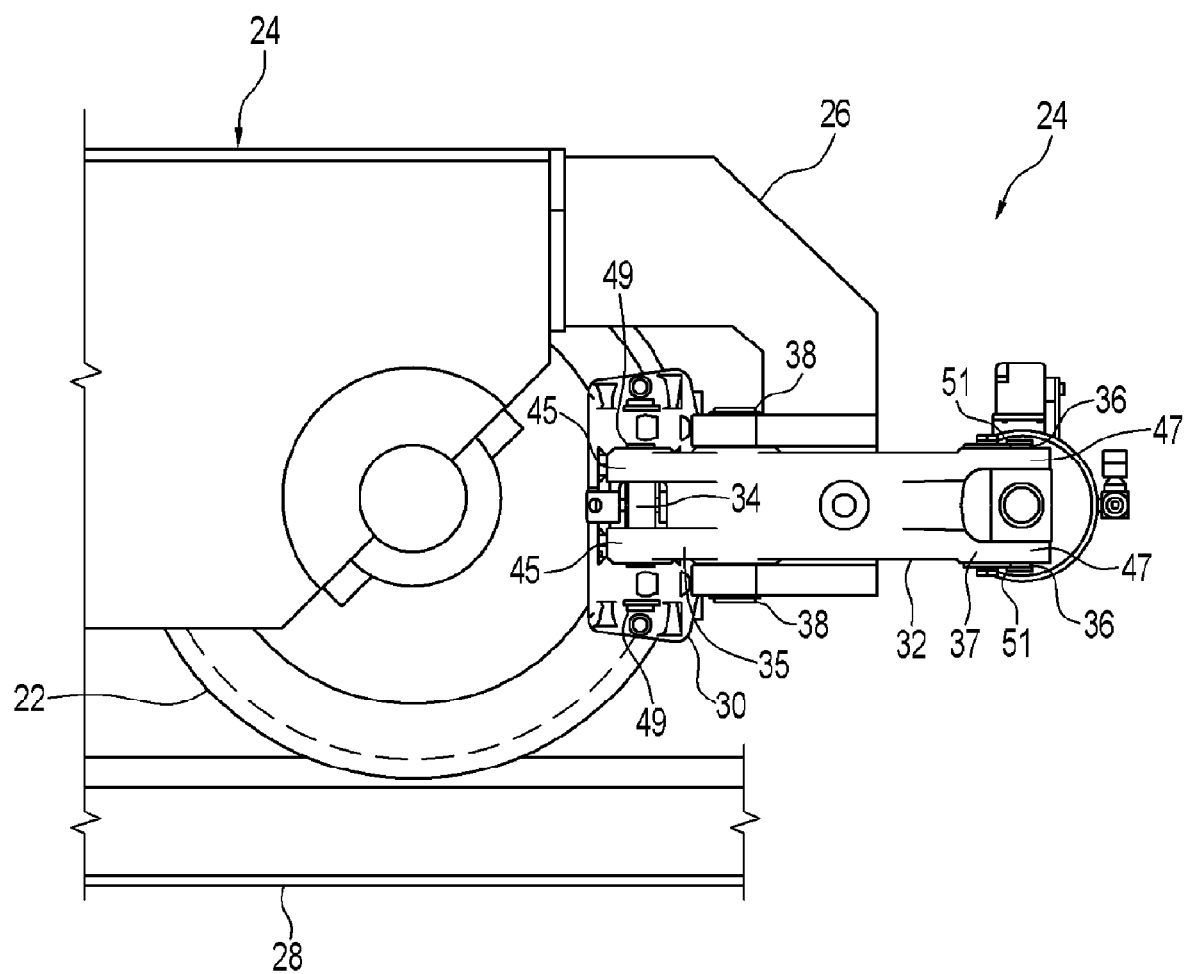
FIG. 1 is a side view of parts of a crane with a wheel brake mounted on a wheel.

In FIG. 1, there is shown a wheel brake, in the form of a lever-type caliper disc brake, indicated generally by reference numeral 20. The wheel brake 20 is connected to parts of a crane, indicated by reference numeral 24, by way of a mounting member 26. The wheel brake 20 is used to brake wheel 22. In the present embodiment, the crane moves along rails, only one of which is illustrated and indicated by reference numeral 28.

Figure 2:
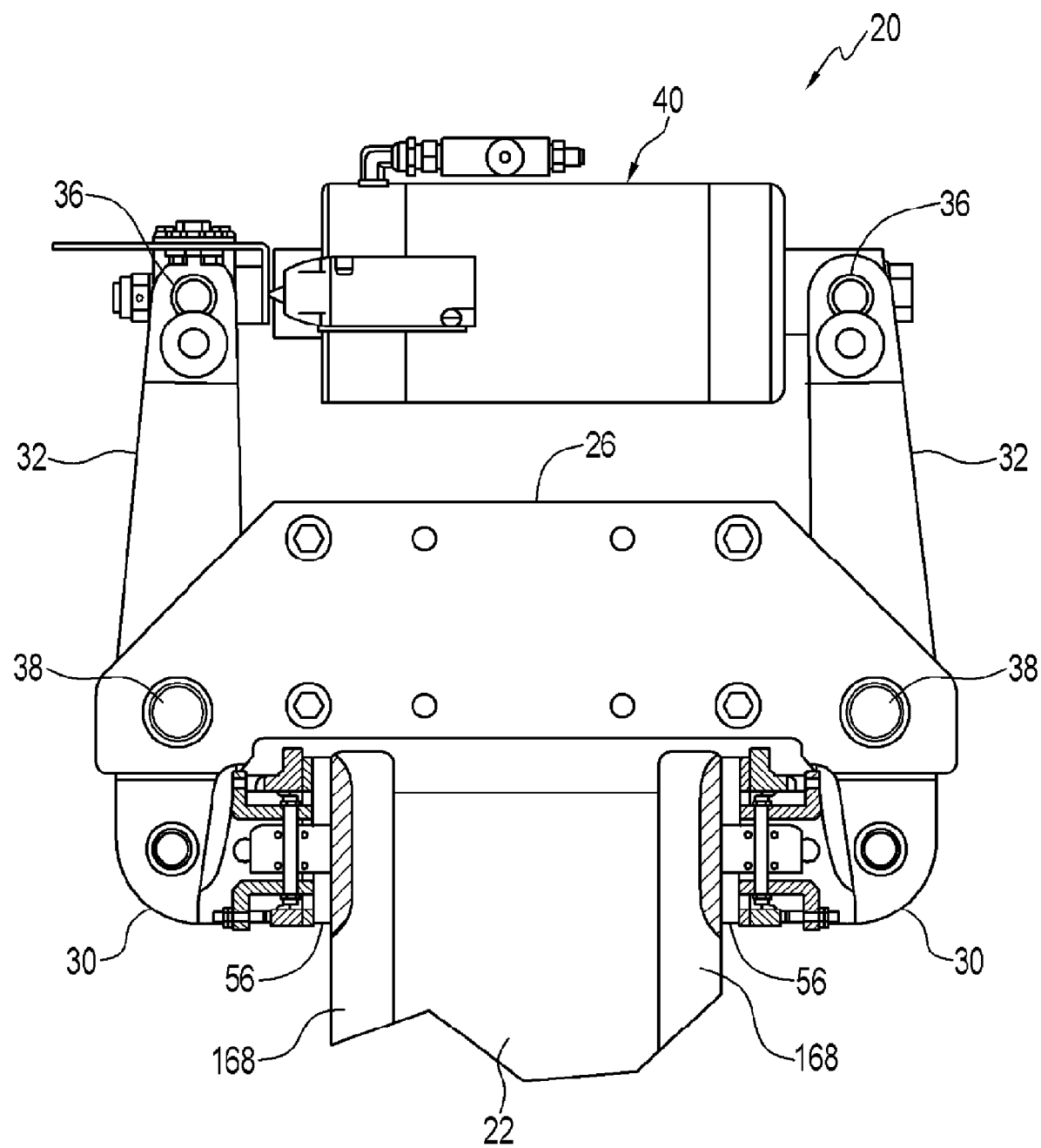
FIG. 2 is a bottom view of the crane parts of FIG. 1.

Referring now to FIGS. 1 and 2, the wheel brake 20 has a pair of brake shoes 30 and a pair of brake levers 32 at opposite sides of the wheel 22. A braking force generator, in the form of a spring-activated, hydraulically releasable piston and cylinder device, is indicated generally by reference numeral 40. Each of the brake levers 32 is pivotally connected to its respective brake shoe 30 by a pivot pin 34 extending through a bifurcated end 35 of the brake lever 32. At opposite bifurcated ends 37, the brake levers 32 are connected to opposite ends of the braking force generator 40 by a pair of pivotal pins 36. Each of the brake levers 32 is connected to its respective mounting member 26 by a pivot pin 38, and the pivot pins 38 form fulcrums located between the pivot pins 34 and 36.

Figure 3:
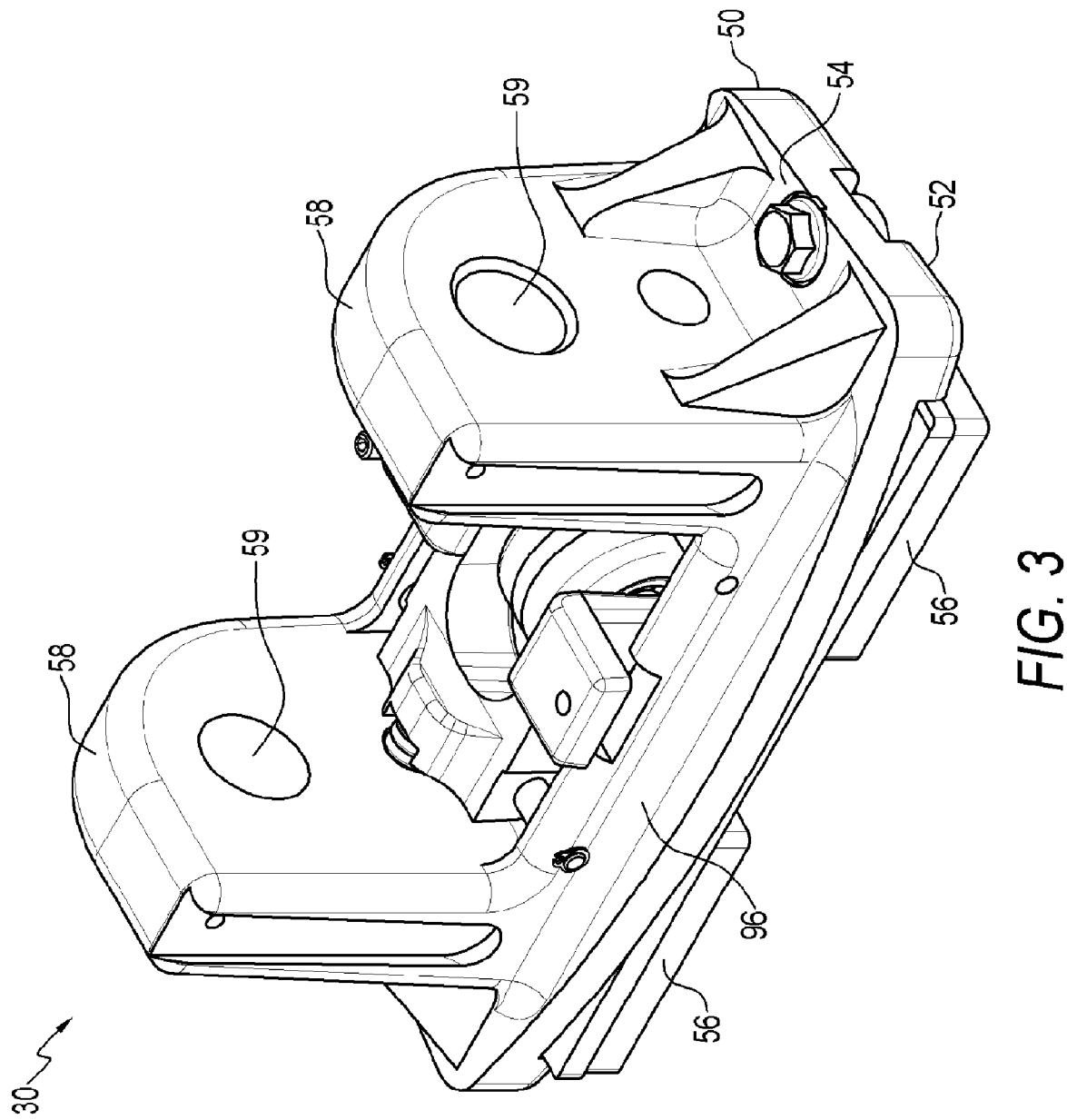
FIG. 3 is a perspective view of a brake shoe of the wheel brake of FIG. 1.

One of the brake shoes 30 is shown in greater detail in FIG. 3 and has an elongated member, known in the art as a brake plate 50. The brake plate 50 has a first surface 52 and a second surface 54. A brake pad 56 is attached, in two separate sections, to the first surface 52.

A pair of brake shoe mounting lugs or members 58 extend from the second surface 54 near opposite ends of the brake plate 50. Each of the mounting members 58 has a bore 59. The pivot pin 34 extends through the bores 59 of the brake shoe mounting members 58. To connect the brake shoe 30 to its respective brake lever 32.

Each of the brake levers 32 is therefore pivotally connected to its respective brake shoe 30 by the respective pivot pin 34. In the present embodiment, the bifurcated end 35 of the brake lever 32 has a pair of substantially parallel arms 45 (see FIG. 1), and the bifurcated end 37 has a pair of substantially parallel arms 47. The arms 45 have bores 49, and the arms 47 have bores 51. The pivot pins 34 extend through the bores 49 of the pair of arms 45 of the bifurcated end 35. Similarly, the pivot pins 36 extend through the bores 51 of the arms 47 so as to pivotally connect the braking force generator 40 to the brake levers 32.

Referring now to FIGS. 4-8, a spring assembly indicated generally by reference numeral 60 protrudes from one of the mounting members 58. The spring assembly 60 comprises a helical compression spring 62 and a U-shaped member 64. A first end 66 of the helical compression spring 62 abuts a spring retraining ring 68 (see FIG. 7) within a bore 63 in one of the mounting members 58, and a second end 70 of the helical compression spring 62 abuts a surface 72 of the U-shaped member 64.

The surface 54 of the brake plate 50 has raised portions 96 on opposite sides of the brake shoe 30 and the raised portions 96 have a pair of bores 98. The U-shaped member 64 is pivotally mounted on a pivot pin 100 extending through the bores 98. Snap rings 102, of which only one is shown, retain the opposite ends of the pivot pin 100 to the raised portions 96. The helical compression spring 62 biases the U-shaped member 64 to pivot about the pivot pin 100, as discussed in more detail below.

The U-shaped member 64 has a pair of arms 76 (see FIG. 6), each having an L-shaped extension 78 (see FIG. 5) extending transversely of the respective arm 76. Each of the L-shaped extensions 78 has a bore 80 and at least one of the L-shaped extensions 78 has a bore 82 which is internally threaded and receives a bolt 92.

A roller assembly, indicated generally by reference numeral 84, comprises a brake pad guide roller 86 rotatable about a pin 88 on ball bearings 90. The roller assembly 84 is connected to the L-shaped extensions 78 of the spring assembly 60 by the pin 88, which extends through the bores 80.

The spring assembly 60 biases the roller 86 to project beyond the brake pads 56 by pivoting the U-shaped member 64 about the pivot pin 100. The bolt 92 acts as a set screw which adjustably limits the amount of projection of the roller 86 beyond the brake pads 56 by abutting a surface 94 on one of the raised portions 96 of the second surface 54 of the brake plate 50.

Figure 4:
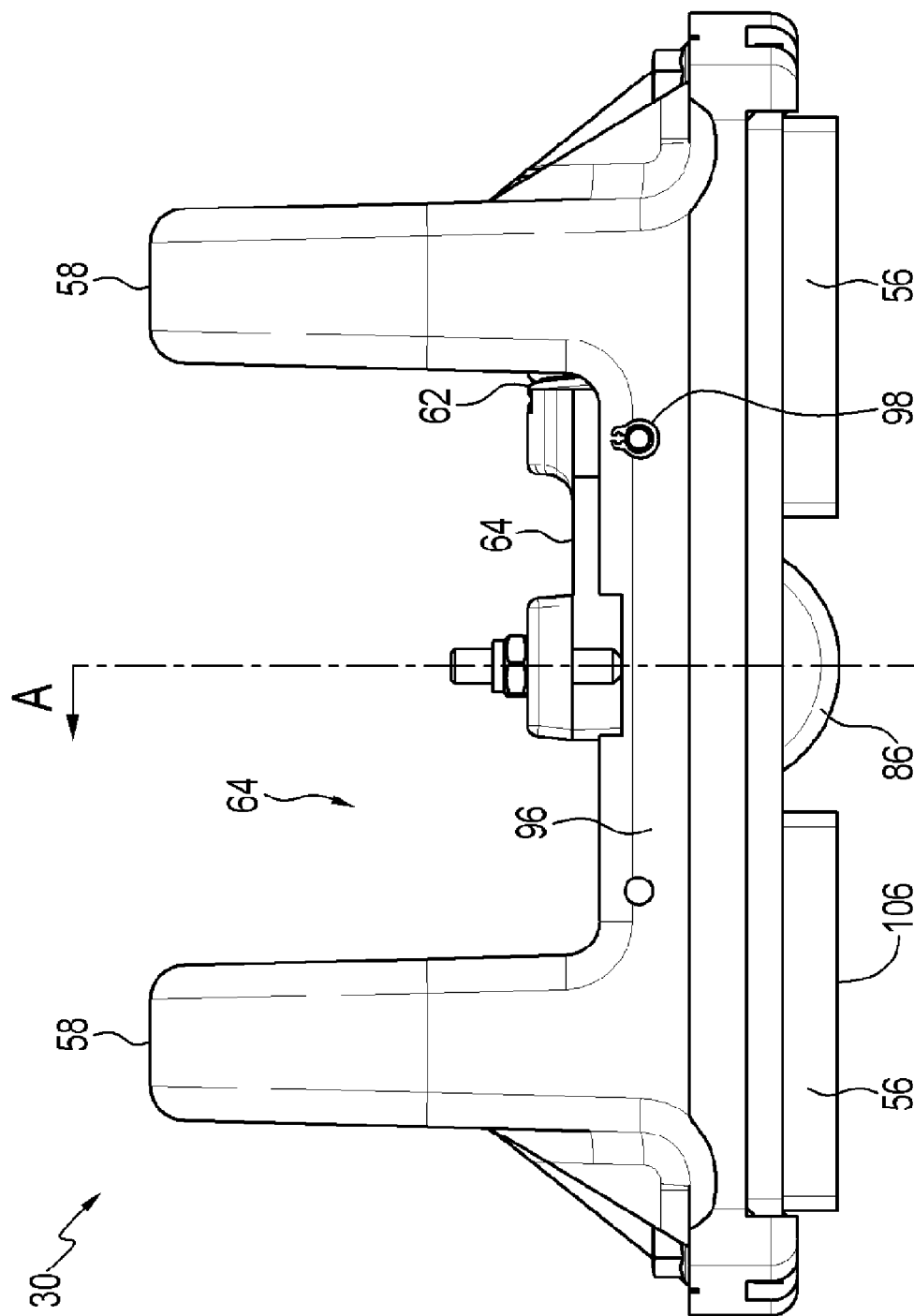
FIG. 4 is a view in side elevation of the brake shoe of FIG. 3.
Figure 6:
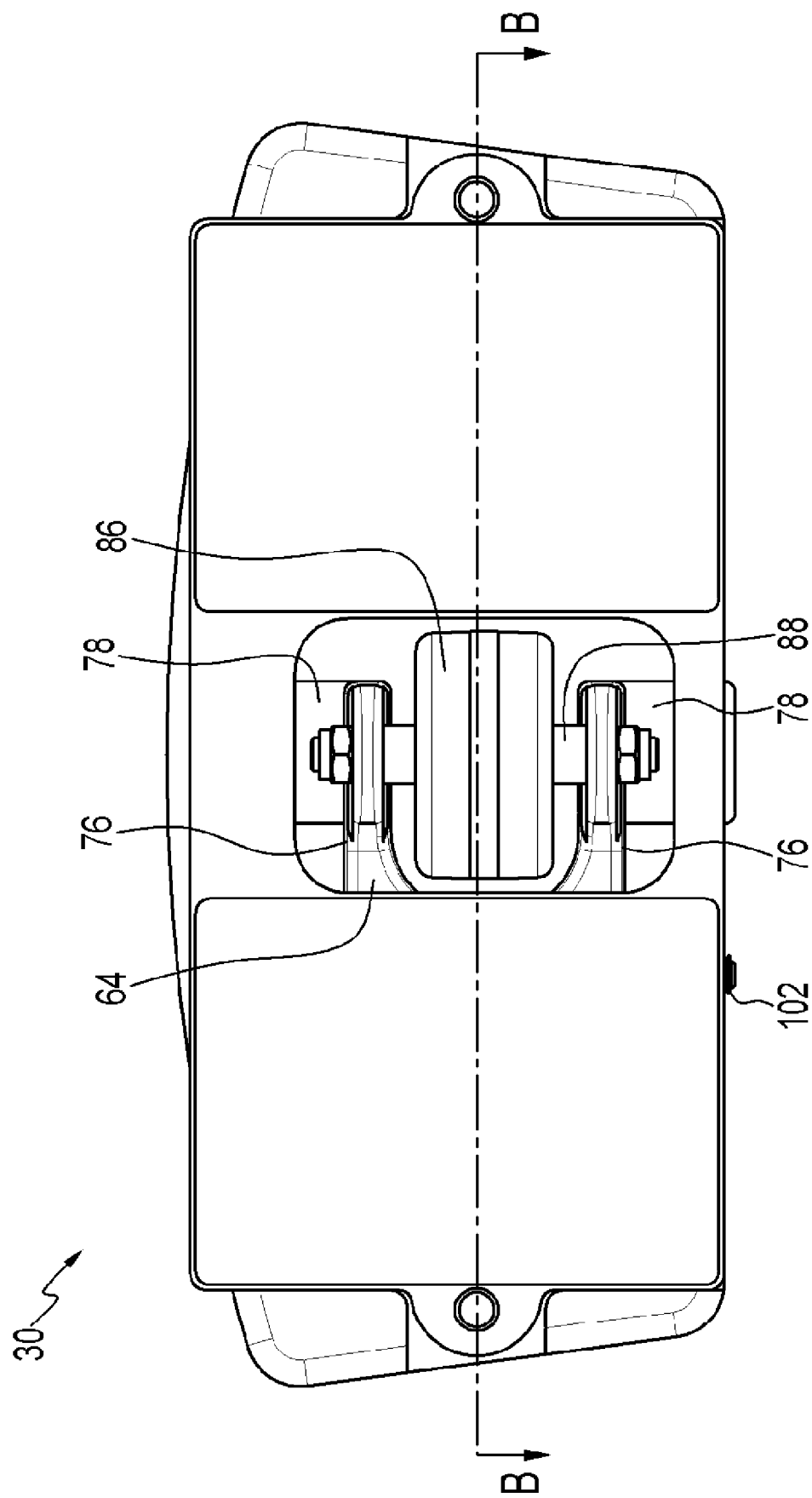
FIG. 6 is a bottom plan view of the brake shoe of FIG. 3.
Figure 7:
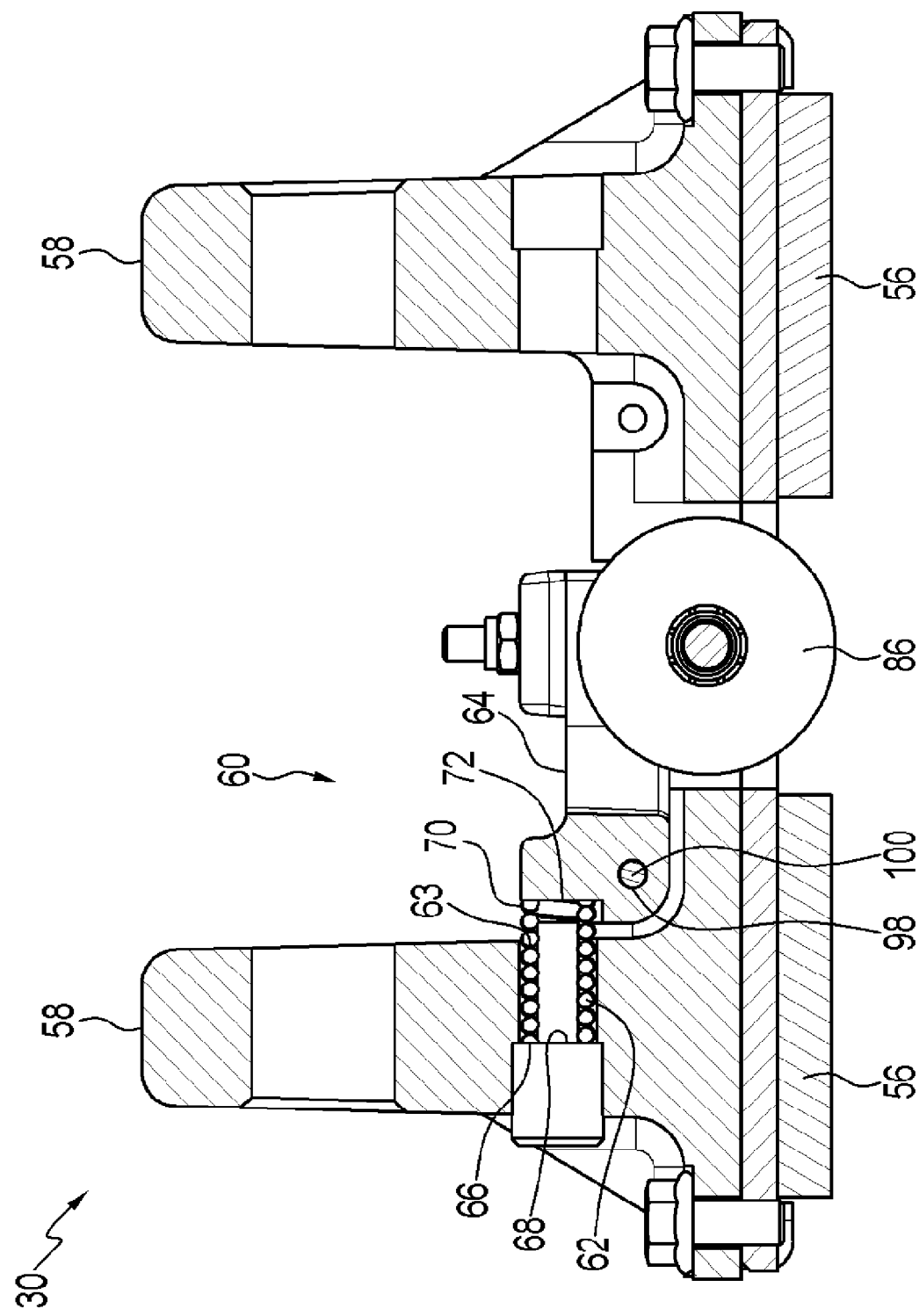
FIG. 7 is a view taken in cross-section along line B-B of FIG. 6.
Figure 8:
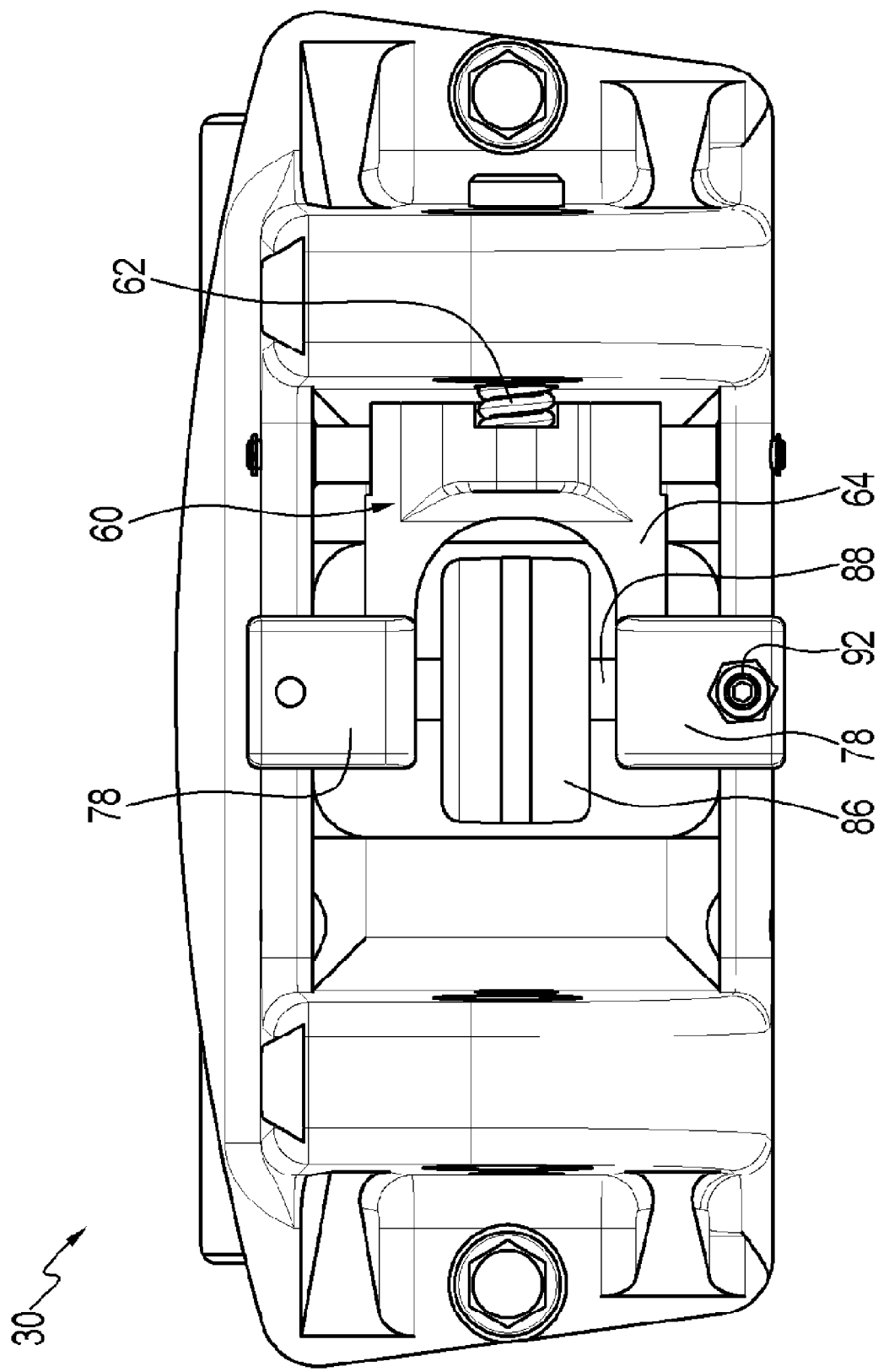
FIG. 8 is a top plan view of the brake shoe of FIG. 3.

As best shown in FIGS. 4, 6 and 7, the brake pad guide roller 86 is in a central location of the brake shoe 30. This provides an advantage over placing the brake pad guide roller 86 at another region of the brake shoe 30, for instance, at either end of the brake shoe, since brake pad guide rollers located at either end of the brake shoe 30 would not be in a center of pressure and would create a moment about a shoe pin. This moment would cause shoe pivoting, and a guiding means, for example a pair of brake pad guide rollers at opposite ends of the brake shoe, would be required to prevent such pivoting. By locating the roller in the center of the shoe, therefore, only one roller assembly is required per shoe instead of two.

Using one wide brake pad guide roller per shoe, as in the present embodiment of the invention, or alternatively two brake pad guide rollers per shoe that are centrally located (not shown), provides a guiding means that keeps the brake pad 56 parallel with the side of the wheel in a free running condition. This prevents contact between the brake pad 56 and the wheel 22 and therefore prevents wearing of the brake pad 56 when the brake is released.

In the present embodiment, the spring assembly 60 is easily removable from the brake shoe 30. To remove the spring assembly 60, the snap ring 102 is removed and the pivot pin 100 is withdrawn so that the U-shaped member 64 and the spring 62 can be removed from the pivot pin 100.

The brake pad guide rollers 86 are easily retracted into the brake shoes 30 during braking, i.e. when the braking force generator 40, shown in FIG. 2, presses the brake shoes against opposite sides of the wheel 22, because the braking force generated by the braking force generator 40 is sufficient to overcome the force of the springs 62. The brake pad guide rollers 86 begin to retract until the brake pads 56 contact the opposite sides of the wheel 22. At this point the brake pads 56 and brake pad guide rollers 86 are in contact with the wheel 22, as shown in FIG. 2.

Figure 5:
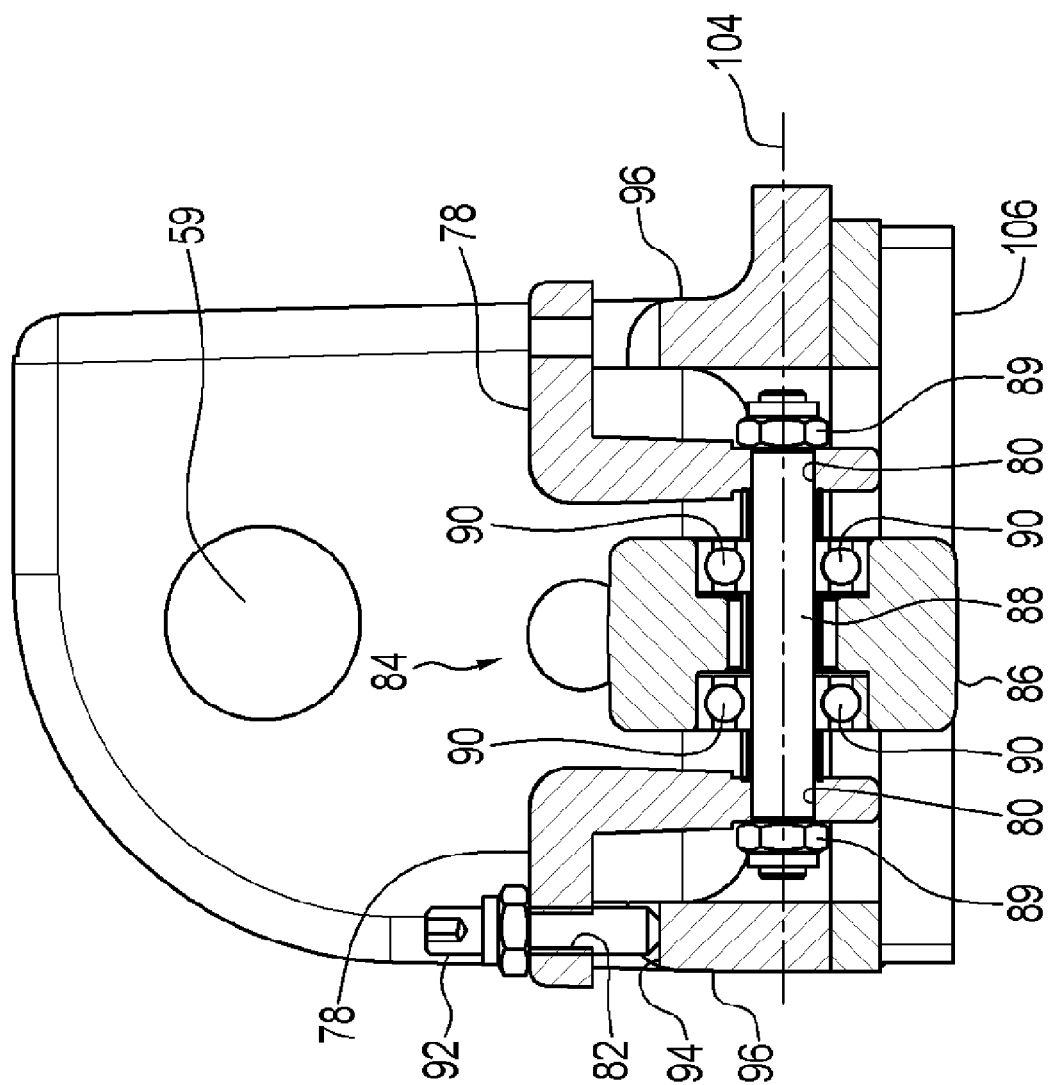
FIG. 5 is a view taken in cross-section along the line A-A of FIG. 4.

The brake pad guide rollers 86 have a rotational axis 104, i.e. the axis of the pin 88, as shown in FIG. 5. The rotational axis 104 is parallel with the first surface 52 of the brake shoe 30 and correspondingly to a brake pad surface 106 of the brake pad 56. As the brake pad guide roller 86 contacts the wheel 22, as in the above situation, the rotational axis 102 of the brake pad guide roller brings the brake shoe 30 and consequently the brake pad 56 into alignment with a side of the wheel 108, as shown in FIG. 2. This prevents the brake pad surface 106 from contacting the side of the wheel 108 in an uneven fashion, that would cause uneven wear of the brake pad 56.

In another situation, the wheel 22 presses against only one of the brake pads 56. This situation occurs when the wheel 22 has enough lateral float due to the arrangement of wheel support bearings and manufacturing tolerances. In this instance, the wheel 22 presses against the brake pad guide roller 86 of that one of the brake shoes 30. The reaction force of the spring 62 towards the wheel 22 is sufficient to maintain the separation between the brake pad 56 and the wheel 22. The wheel 22 therefore presses sufficiently against the brake pad guide roller 86 to cause the whole wheel brake 20 to pivot about the pivotal connections 38, thus preventing the wheel from contacting the brake pads 56.

As will be apparent to those skilled in the art, various modifications may be made in the present invention within the scope of the appended claims.

The invention claimed is:

1. A wheel brake for braking a wheel moving along a track, the wheel brake comprising:
    a pair of brake shoes, each of the brake shoes including an elongate member with a first surface for facing a corresponding side of the wheel, and each of the brake shoes having an opening in a central location on the first surface thereof;
    a brake pad attached to the first surface of the elongate member of each of the brake shoes;
    a brake pad guide roller disposed in the opening of each of the brake shoes, the brake pad guide roller maintaining the brake pad parallel to the corresponding side of the wheel, and the brake pad guide roller having a rotational axis parallel to the corresponding side of the wheel;
    a spring biasing the brake pad guide roller of each of the brake shoes to project through the opening and beyond the brake pad; and
    a braking force generator operatively connected to the brake shoes.

2. The wheel brake as claimed in claim 1, wherein the braking force generator comprises a spring-activated, hydraulically releaseable piston and cylinder device.

3. The wheel brake as claimed in claim 1, wherein each of the brake shoes further includes:
- a second surface on the elongate member, the second surfacing being opposite to the first surface;
- a pair of opposed mounting members on the second surface; and
- a mounting bar received by and extending between the pair of mounting members.

4. The wheel brake as claimed in claim 3, wherein each of the brake shoes further includes a spring assembly comprising a spring and a U-shaped member pivotally connected to the elongate member, the brake pad guide roller being rotatably connected to the U-shaped member and the U-shaped member being pivotably biased by the spring so that the brake pad guide roller projects through the opening of the elongated member.

5. The wheel brake as claimed in claim 4, wherein the spring assembly further comprises a pivot rod connected to the elongate member, the U-shaped member being mounted on the pivot rod.

6. The wheel brake as claimed in claim 5, wherein a snap ring secures the pivot rod to the elongate member.

7. The wheel brake as claimed in claim 4, wherein the U-shaped member comprises:
- a pair of arms forming the U-shape; and
- a pair of L-shaped members, each of the L-shaped members extending transversely of a respective one of the arms near an end of said one of the arms.

8. The wheel brake as claimed in claim 4, wherein the brake shoe further comprises an axle rotatably connecting the brake pad guide roller to the L-shaped members.

9. The wheel brake as claimed in claim 1, wherein each of the brake shoes further includes an adjustable stop limiting the projection of the brake pad guide roller beyond the brake pad.

10. The wheel brake as claimed in claim 1, wherein the wheel brake is coupled to a crane and the wheel moves the crane along the track.

* * * * *